March 14, 1939.　　K. C. D. HICKMAN　　2,150,684
DISTILLATION OF SOLIDS
Filed Feb. 21, 1936　　2 Sheets-Sheet 1
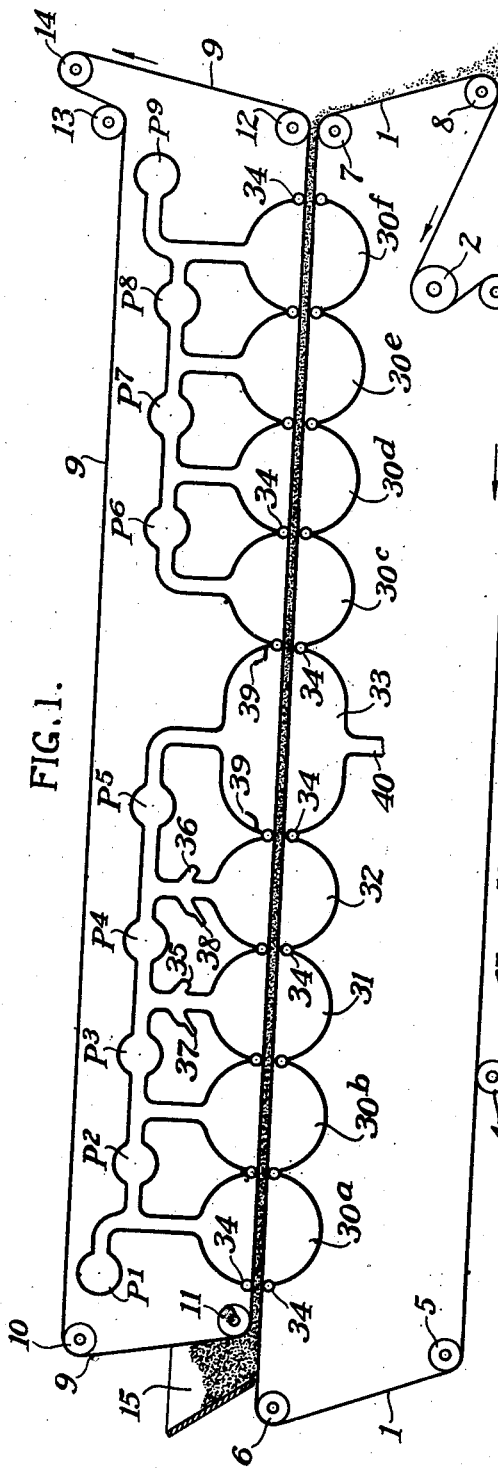
INVENTOR.
Kenneth C. D. Hickman
BY
Newton A. Perkins
Henry S. Boynton
ATTORNEYS March 14, 1939.　　　K. C. D. HICKMAN　　　2,150,684
DISTILLATION OF SOLIDS
Filed Feb. 21, 1936　　　2 Sheets-Sheet 2
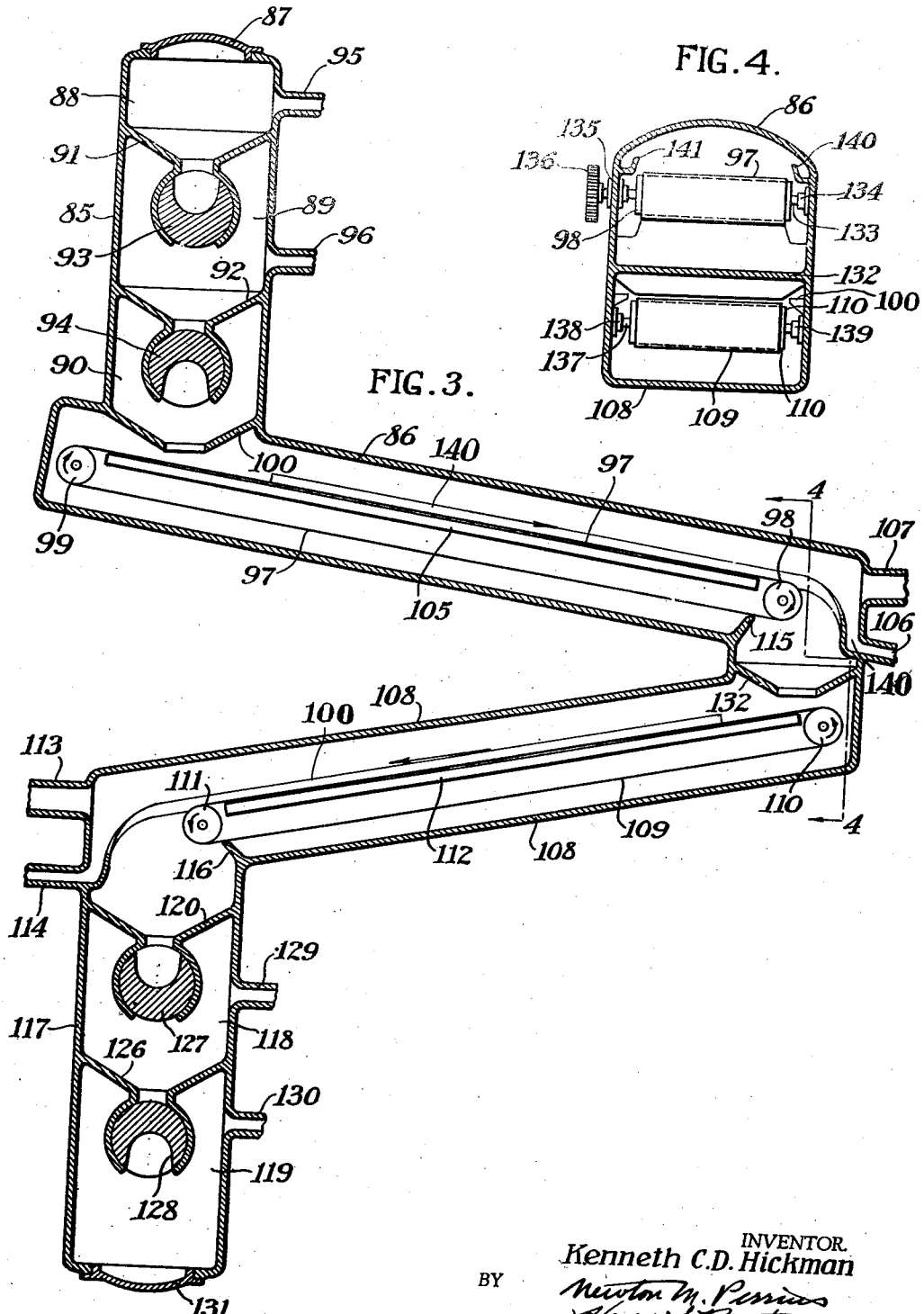
INVENTOR.
Kenneth C.D. Hickman
BY
ATTORNEYS Patented Mar. 14, 1939

2,150,684

UNITED STATES PATENT OFFICE 2,150,684

DISTILLATION OF SOLIDS

Kenneth C. D. Hickman, Rochester, N. Y., assignor, by mesne assignments, to Distillation Products, Inc., Rochester, N. Y., a corporation of Delaware Application February 21, 1936, Serial No. 65,121

8 Claims. (Cl. 202—52)

This invention relates to a process of high vacuum distillation and more particularly to the molecular distillation of solid mixtures and naturally-occurring products containing both solids and liquids.

Heretofore it has been customary to obtain oils and extracts containing odors, drugs, vitamins, and other principles from plant and vegetable substances and certain animal organs by subjecting the materials to high pressure. The liquid which results from this treatment is only a portion of the total liquid contained in the material and it is usual to increase the yield by performing the expressing operation in a heated press or else by adding solvent to the material before extraction. No pressing process has yet succeeded in expelling all the volatile or extractable substances from the material and while solvent extraction has enabled this to be done almost completely, it entails a new problem, which is the elimination of the solvent from the extract. Furthermore, it is not possible to choose any one solvent which will extract all the soluble or volatile substances from the original material. In the treatment of oil-bearing seeds and of animal matter, containing fats and oils, where the oil alone is of importance, the well-known method of cold pressing yields an excellent product, the solid fibers of the vegetable and animal matter providing a natural filtering matte for the purification of the oil. The greatest drawback to cold pressing is that the yield is low. Hot pressing and solvent extraction increases the yield, but they increase the contamination of the oil with non-oily impurities, such as protein, sterols, and odoriferous principles.

When, however, the oil is of secondary importance and the vitamin, sterol, and odoriferous or medicinal constituents are of first importance, no means hitherto known will effect complete removal on a commercial scale. While hot pressing and solvent extraction decrease the quantity of the sterol, vitamins, or other accessory bodies left in the matte, it is often found that the concentration of these factors in the expressed oil is even less than secured by cold pressing, owing to decomposition which occurs during the process.

An object of this invention is to obtain the valuable organic constituents such as oils, and therapeutic agents from solid animal and vegetable source material without recourse to expressing treatment, solvent extraction or chemical action. Another object is to remove oils and therapeutic agents such as vitamins from natural solid materials by high vacuum distillation without concurrent decomposition of the materials treated. Another object is to obtain concentrated distillates of oils such as glycerides, fat soluble vitamins, sterols, etc., by subjecting natural solid materials containing them to molecular distillation. Other objects will appear hereinafter.

These objects are accomplished by subjecting the solid materials to high vacuum distillation. It may be desirable to perform this distillation in a number of stages, condensing part of the gases evolved at each stage in appropriately situated and cooled chambers, but is contemplated that in the final stage, the molecules of distillate shall be allowed to have an appreciable, mean-free path so that the distillate can be condensed on a surface located at a distance from the evaporative surface of less than approximately the mean-free path.

In the following examples and description I have set forth several of the preferred embodiments of my invention, but it is to be understood that they are included merely for purposes of illustration and not as a limitation thereof.

The solid substance containing the desired oil, therapeutic agent, etc., is subject to distillation, preferably after mincing and grinding. These operations are necessary to break up the cellular structure of most natural products and to leave a large surface available for the emission of gases. While the mincing and grinding is always performed before distillation, it is contemplated that a further action of mincing and grinding or other action to disturb the particles shall be performed during the distillation process itself.

Before the material is subjected to molecular distillation, it is necessary to perform operations of degassing, dehydrating, and preliminary high vacuum distillation, the vacuum, being, however, not sufficiently high to be classed as molecular. During each of these stages, the solids are preferably spread over a large, heated surface. It is seldom practicable to leave the particles unconfined, owing to the tendency for individual grains to explode and decrepitate. It is advantageous, therefore, to enclose the minced material in a thin layer between a solid surface and a porous surface, or between two porous surfaces, and thus the materials to be distilled may be ground and fed into the space between two traveling bands of wire gauze. If one gauze is allowed to travel more rapidly than the other, the imprisoned material is continuously rolled and disturbed and new surfaces are exposed for the evolution of gas. The wire gauze may be heated by conduction or radiation or by electricity.

The materials to be distilled are finely chopped and then dehydrated and degassed in any convenient manner such as heating with or without reduced pressure and are then led into a high vacuum still. Alternatively the materials may be fed into the still immediately after grinding and the degassing and dehydration performed in the first stages of the distillation process. Imprisoning of the particles by traveling bands of wire gauze is necessary when this mode of operation is employed. The distillation treatment enables the removal of substantially all volatilizable matter contained in the solids. Purification of the distillate can be accomplished by chemical treatment or redistillation preferably under molecular conditions in apparatus such as disclosed in Hickman Patents 1,925,559 and 1,942,858.

To simplify the disclosure I will describe my invention as carried out in the distilling apparatus illustrated in the accompanying drawings in which:

Figure 1 illustrates in diagrammatic form a high vacuum still employing conveyor bands.

Figure 2 also in diagrammatic form illustrates a section on a horizontal plane of a still which is a modification of that illustrated in Fig. 1.

Figure 3 illustrates a vertical section of another modification of Fig. 1 and;

Figure 4 illustrates a cross section taken on line 4—4 of Fig. 3.

Referring to Fig. 1 reference number 1 designates an endless conveyor belt which may be of sheet metal or metal gauze which is driven by roll 2 and supported by rolls 3, 4, 5, 6, 7 and 8. Numeral 9 designates an endless belt preferably of metal gauze, but which may be cloth or other fibrous material, supported by rolls 10, 11, 12, and 13, and driven by roll 14. Material to be distilled is placed in hopper 15 between endless belts 1 and 9. Vacuum chambers 30a–f and distillation chambers 31, 32, and 33 are provided with pressure members 34 which maintain contact under pressure with endless belts 1 and 9. Reduced pressure is maintained in vacuum chambers 30 and distillation chambers 31, 32 and 33 by pumps P1–9. Distillation chambers 31 and 32 are provided with fractionating elements 35 and 36 respectively having withdrawal conduits 37 and 38 for removal of condensate. Distillation chamber 33 is provided with gutters 39 which collect material condensing on the upper inside walls of 33 and deliver it by means of a conduit not shown to conduit 40. Receptacle 41 serves to collect distilled solids leaving conveyor 1 at 8.

In Fig. 2 numeral 50 designates a rotatable metal cylinder of large diameter and numeral 51 an endless metal gauze belt loosely mounted circumferentially around cylinder 50. Belt 51 is supported by roll 53 and driving roll 54 and maintained closely adjacent to the periphery of cylinder 50 by tension regulating rolls 55 and 56. Still casing 57 is mounted at a fixed distance from the walls of cylinder 50 and is provided with slit openings at 58 and 59 for entrance and exit of conveyor band 51 and for introduction and removal of chopped solids. Partitions 60, 61, and 62 and 63 divide still casing 57 into five compartments 64 to 68 and due to the pressure contact of the partitions with belt 51 passage of gas from one compartment to another is substantially avoided. Each compartment is provided with a pump conduit, P1–5 to which is attached appropriate vacuum pumps (not shown). Solid material to be distilled is introduced into the space between belt 51 and cylinder 50 by hopper 69. Solid residue is withdrawn through hopper 70.

Referring to Figure 3 reference numeral 85 designates a casing, integral with still casing 86 and provided with a gas tight removable cover 87 through which solid material to be distilled is intermittently admitted. Casing 85 being divided into gas tight compartments 88, 89, and 90 by partitions 91 and 92 and rotating metering valves 93 and 94 respectively, the curved portions of partitions 91 and 92 making gas tight contact aided by lubricants if necessary, with rotating metering devices 93 and 94. Chambers 88 and 89 are maintained at a low pressure by vacuum pumps (not shown) connected to conduits 95 and 96. Still casing 86 has disposed therein an endless conveyor belt 97 preferably of metal, and which is actuated by cylindrical rolls 98 and 99. An elongated electrical heating element 105 is located in contact with the under side of the upper portion of the belt 97. The inside surface of 86 acts as a condensing surface and condensate collects thereon and flows by gravity from troughs located thereon into conduit 106. Free space in casing 86 is maintained at a low pressure by a high vacuum pump, generally a condensation pump (not shown) connected to conduit 107.

Still casing 108 integral with 86 contains endless conveyor belt 109 disposed between cylindrical rolls 110 and 111 and is actuated by the latter. The upper portion of belt 109 is heated by electrical heating element 112 disposed in contact with the under side thereof. Space in still casing 108 is evacuated by a high vacuum pump (not shown) connected to conduit 113. Distillate condensing on the inside walls of 108 flows by gravity into gutter 100 and is removed through conduit 114. Scrapers 115 and 116 are located in contact with belt conveyors 97 and 109 respectively and serve to remove adhering solids therefrom. Casing 117 integral with 108 is divided into gas tight compartments 118 and 119 by means of partitions 120 and 126 and cylindrical rotating valves 127 and 128. Chambers 118 and 119 are evacuated by pumps (not shown) connected to conduits 129 and 130 respectively. Chamber 119 is provided with a gas tight hatch 131 through which solid material is intermittently removed.

Referring to Figure 4 still casing 86 is shown integral with still casing 108. Driving roll 98 for conveyor belt 97 is supported by shaft 133 mounted on an inside bearing 134 and gas tight bearing 135. Shaft 133 is provided with gear 136 engageable with a driving gear (not shown). Roll 110 supporting endless conveyor belt 109 is supported by shaft 137 mounted in bearings 138 and 139 which are mounted upon the inside walls of still casing 108. Gutters 140 and 141 mounted longitudinally on the walls of casing 86 serve to collect distillate condensed upon the upper walls of casing 86 and deliver it to conduit 106 (Fig. 3).

In operation employing the apparatus of Fig. 1, solid chopped material is placed in 15 and due to the rotation of belts 1 and 9 is compressed and taken through the slit formed by pressure rolls 34. The first vacuum chambers 30a, 30b, 31 and 32 serve to remove gases and volatile materials and to enable reduction of pressure. The number of such chambers required will depend upon the amount of water, gas and other volatiles contained in the solid, and the leakage through the narrow openings at 34. It is a well known property of gases that as they are reduced in pressure and correspondingly increased in volume they find greater and greater difficulty in penetrating porous barriers and in passing through small apertures. It is thus possible to cause the distilland to pass through narrow slits from compartment 30a to 30b and so forth, without undue transfer of gas, the successive compartments being held at successively lower pressures due to the action of master pump P1 and auxiliary pumps P2-5 which may be of any convenient design appropriate for the pressure being handled.

The conveyor belts 1 and 9 are heated by electrical conduction and serve to raise the distilland to the required temperature. With most distillands much residual water is evolved in the early compartments of the still. With this water quantities of sterols, odoriferous materials and small amounts of vitamins are removed and may be collected in condensers 35 and 36. As the distilland penetrates the still, successively lower pressures are secured and in chamber 33 the pressure is so low that molecular distillation takes place. Master pump P1 will effect a reduction of pressure to about 400 mm. in 30a and pumps P2, P3 and P4 are designed to produce successively lower pressures so that pump P5 produces and maintains a vacuum appropriate for molecular distillation. Pumps P6-9 operating in the same manner serve to remove gases leaking through the successive slits from the exit end of the apparatus. The walls of chamber 33 are located at a distance from the distilland of less than about the mean free path and condensate collecting thereon flows by gravity into gutters 39 and thence to withdrawal conduit 40. The distilland residue is then conveyed through chambers 30c-f into the atmosphere.

In some cases it may be desirable to enclose the distillation system of Fig. 1 in a gas tight vacuum casing and introduce and remove distilland using a hopper system such as disclosed in Fig. 3. The amount of gas to be removed and consequently the number of pumps required would be less. The expense and inconvenience of such a vacuum jacket confers doubtful advantages.

The conveyor belts 1 and 9 may be run at the same speed but it has been found that a difference in speed results in stirring of the solid distilland and enables faster and more complete vaporization. The gauze used in the belt may have any desired aperture, but a screen size considerably smaller than that of the distilland particles enables rapid removal of vapors and at the same time prevents solids from sifting through and filling the chambers.

In operating the apparatus of Fig. 2, powdered solid is introduced through the aperture of 69 and forced or carried by belt 51 through slit 58 into the distillation chamber where it is firmly held in a thin layer against the surface of rotating cylinder 50 which is heated by electricity or circulation of a heating fluid. In chambers 64 and 65 degassing takes place at successively lower pressures maintained by pumps P1 and P2 on the same principles explained in the description of Fig. 1. Chamber 66 is maintained under a molecular vacuum and condensate is condensed on walls of casing 57 and withdrawn through an appropriately located conduit. Gas leaking through opening 59 is removed in chamber 68 by pump P5 and at a lower pressure in 67 by pump P4. Due to tensioning rolls 55 and 56 solids are tightly held against the walls of cylinder 51. Solid residue is withdrawn through the aperture of hopper 70.

In the apparatus of Figs. 1 and 2 the number of degassing or pressure lowering chambers required to finally reach a molecular vacuum will depend upon the material treated, the design of the apparatus and the type, capacity and efficiency of the pumps. It is, therefore, to be understood that the type of pumps and the number and size of vacuum chambers can be varied without departing from the spirit and scope of my invention.

In operation employing the apparatus of Figs. 3 and 4, solid, finely divided and dehydrated material to be distilled such as wheat germ is introduced into hopper 88 through opening 87. Hopper 88 should preferably be of sufficient capacity to hold enough material for a considerable period of operation without refilling. The wheat germ is then degassed by a vacuum pump connected with conduit 95. This operation removes absorbed gases, residual water and volatile materials. The degassing rate can be increased by providing hopper 88 with heating means such as internal heating pipes. The wheat germ is conveyed into hopper 89 by rotating valve 93 the amount transferred being regulated by the rate of rotation of valve 93 and by varying the size of its pocket. Valve 93 is in substantially gas tight contact with the curved portion of partition 91 and may be lubricated preferably with a dry lubricant such as graphite where contamination with a grease is undesirable. On entering hopper 89 the wheat germ is further degassed by a pump connected with conduit 96 and any gas entering through rotating valve 93 is also continuously removed. Hopper 89 is preferably of considerable volume in order to hold sufficient material to enable operation while hopper 88 is being refilled and degassed. Wheat germ is delivered onto plate 100 at a rate controlled by the rate of rotation of valve 94 and is evenly distributed upon the conveyor belt 97 by the action of plates 100.

Conveyor belt 97 conveys the thin layer of wheat germ over the heater 105 and as it is in contact therewith heat is transferred to the wheat germ and it is thus raised to distilling temperature. The temperature may be so controlled that vitamin E alone or the vitamin and part or all of the glyceride content is vaporized. It is best to employ a temperature which vaporizes the vitamin and part of the glycerides in still 86 and a temperature sufficient to vaporize the balance of glycerides in still 108. The vapors given off are condensed upon the inside walls of casing 86 and flow by gravity into gutters 140 and 141 (Fig. 4) and delivered thereby to conduit 106. Wheat germ falls by gravity from belt 97 at roll 98 onto plates 132 which evenly distribute it upon belt 109. Heater 112 maintains the distillation temperature and condensate is removed from the perature and condensate is removed from the walls of 108 by gutters mounted longitudinally thereon in the same manner as in still casing 86 and delivered to conduit 114. A high vacuum is maintained in casing 108 by a high vacuum pump or pumps connecting with conduit 113.

The wheat germ falls by gravity from belt 109, at the roll 111, onto partition 120 from which it is transferred into hopper 118 by gas tight rotating valve 127 and thence into hopper 119 through gas tight rotating valve 128. Hopper 119 is preferably of sufficient volume to enable operation without frequent removal of distilland. Air entering on such removal is withdrawn by a pump connected with conduit 130 and gas leaking past valve 128 is removed by a pump connected with conduit 129.

Casings 86 and 108 are shown as being air cooled. They can be provided with heat radiating fins or jacketed for circulation of a cooling fluid if desired.

The temperatures employed in heater 105 and 112 obviously depend upon the character of the material being distilled, what is to be removed as distillate and the rate of conveyance of the solids through the still. With a fast rate of travel through the still it may be necessary to have both 105 and 112 at the same temperature in order to remove all of one fraction. Preferably the rate of travel is so adjusted that one fraction is removed in still 86 and another fraction in still 108 at a higher temperature. Obviously several still casings may be connected in series in order to remove any desired number of fractions. When operating under molecular distillation conditions the distance separating the evaporating surface and the condensing surfaces 86 and 108 should be short and preferably should be less than about the mean free path of the molecules of residual gas. This distance varies according to the pressures obtaining in the stills.

When subjecting the solids to what is known as molecular distillation the operating conditions should correspond to those which enable such a distillation to take place. Processes of molecular distillation are those occurring under such high vacuum conditions that a large proportion of the vaporized molecules do not return to the vaporizing surface and are condensed upon a surface located at a distance from the vaporizing surface of less than approximately the mean free path of the molecules of residual gas. Greater distances may be employed, but only with considerable decrease in rate of distillation. For practical purposes molecular distillation ceases where the distance is double the mean free path. The mean free path is inversely proportional to the pressure, therefore, the lower the pressure the greater may be the distance separating the evaporating and condensing surfaces. Thus with a residual gas pressure of three microns a distance of one inch may be used, or a quarter of an inch at less than 8 microns or ten inches at less than .3 micron, etc. With pressure and distance as interchangeable quantities no real lower limit to the pressure or upper limit to the distance can be set, but for reasons of operating convenience it is generally preferred not to operate at a residual gas pressure of less than .01 micron or a distance of more than ten feet. Pressures greater than .1 mm. do not give a mean free path sufficient to separate the distillate without contamination. Those below .01 mm. such as between .001 and .00001 mm. are preferred.

The process of my invention is, however, applicable to conditions other than those used in molecular distillation processes. The distance separating the evaporative and condensing surfaces may be several times the mean free path and the rate of vaporization increased by high temperatures, etc., to a degree sufficient to transfer to the condensing surface by diffusion and/or convection.

In selecting the temperature to be used consideration must be given to the character of the solid material to be distilled and the pressures used. Solid materials containing very low vapor pressure materials which are to be separated as distillate must be heated to temperatures approaching their decomposition point even though the lowest pressures obtainable are used. With such compounds temperatures as high as 350° C. are useful. Glycerides usually have a low vapor pressure, and may be distilled at about 150° to 325° C. The separation of more volatile substance can be effected at lower temperatures such as between about 70° and 300° C. and usually between 70° and 250° C. Vitamins can be satisfactorily distilled from solid substances at these latter temperatures.

It is apparent that a cyclic or batch process can be used instead of the continuous method of distillation disclosed. While I have described my invention as being carried out in the particular apparatus disclosed it is apparent that other types of apparatus may be employed without departing from the spirit or scope of my invention.

The process of my invention is applicable to the high vacuum distillation of any solid substance containing volatilizable matter and is especially useful where the substance to be separated is of a relatively difficultly volatilizable nature. Glycerides and/or fat soluble vitamins and other therapeutic agents and oils may thus be distilled from solid vegetable and animal tissues generally such as corn, linseed, cottonseed, soya bean, castor bean, cereal products, and tuna, salmon, halibut, menhaden, cod, etc., fish body and liver tissue. The process is also useful in the recovery of hydrocarbons from solid substances containing them such as oil bearing shale.

Where the distillate does not flow with sufficient rapidity from the condensing surface an entraining liquid may be circulated thereover as described in application #61,790 filed January 31, 1936, in the names of Hickman and Hecker.

What I claim is:

1. A method for short-path, high vacuum distillation of solid substances which comprises, disposing pieces of the solid in a thin layer on a heated moving surface, condensing vaporized molecules on a near-by condensing surface, maintaining a high vacuum in the space between the surface of the layer and the condensing surface and continuously removing condensate from the condensing surface.

2. A method for short-path, high vacuum distillation of solid substances which comprises disposing pieces of the solid in a thin layer on a heated moving surface, agitating the pieces of solid while they are heated, condensing vaporized molecules on a near-by condensing surface and maintaining a high vacuum in the space between the surface of the layer and the condensing surface.

3. The process of distilling pieces of chopped animal or vegetable cellular tissue which comprises disposing the chopped tissue in a layer upon a heated moving surface, agitating and at the same time heating the tissue to distillation temperature and condensing distillate on a condensing surface located in close proximity to the heating surface, the space between the two surfaces being maintained at a pressure below about .1 mm.

4. The process of removing and recovering complex difficulty volatilizable organic compounds from solid substances which contain them that comprises, dividing said solid substance into fine particles, degassing the particles, depositing the particles in a thin layer, composed only of solid particles, on a heated movable conveyor, conveying them past a condensing surface from which the particles are separated by a short distance and by substantially unobstructed space, and maintaining a high vacuum in the space between the particles and the condensing surface whereby the said compounds are volatilized and condensed upon the condensing surface.

5. The process of removing and recovering, without harmful decomposition, complex, difficultly volatilizable organic compounds from solid natural vegetable or animal substances that comprises mincing the substance into finely divided discrete particles, degassing the particles, depositing the degassed and finely divided particles in a thin layer, composed only of solid particles, on a heated movable conveyor, conveying them past a condensing surface from which the particles are separated by a short distance and by substantially unobstructed space, and maintaining a high vacuum in the space between the particles and the condensing surface whereby the said compounds are volatilized and condensed upon the condensing surface.

6. The process of removing and recovering, without harmful decomposition, complex, difficultly volatilizable organic compounds from solid natural vegetable or animal substances that comprises dividing the solid into small discrete particles, degassing the particles, depositing the degassed and finely divided particles in a thin layer, composed only of solid particles, on a heated movable conveyor, conveying them past a condensing surface from which the particles are separated by a distance of less than approximately ten inches and by substantially unobstructed space, and maintaining a pressure of less than approximately .1 mm. of mercury in the space between the particles and the condensing surface whereby the said compounds are volatilized and condensed upon the condensing surface by high vacuum, short path distillation.

7. The process of removing and recovering without harmful decomposition a vegetable or animal fat from solid vegetable or animal substances that comprises dividing the substance into small discrete particles, degassing the particles, depositing the degassed and finely divided particles in a thin layer, composed only of solid particles, on a heated movable conveyor, conveying them past a condensing surface from which the particles are separated by a distance of less than approximately the mean free path of the molecules of residual gas and maintaining a pressure of less than .1 mm. of mercury in the space between the particles and the condensing surface whereby the animal or vegetable fat is volatilized and condensed upon the condensing surface by molecular distillation.

8. The process of removing and recovering without harmful decomposition a vitamin from solid vegetable or animal substances that comprises dividing the substance into small discrete particles, degassing the particles, depositing the degassed and finely divided particles in a thin layer, composed only of solid particles, on a heated movable conveyor, conveying them past a condensing surface from which the particles are separated by a distance of less than approximately the mean free path of residual gas and maintaining a pressure of less than .1 mm. of mercury in the space between the particles and the condensing surface whereby the vitamin is volatilized and condensed upon the condensing surface by molecular distillation.

KENNETH C. D. HICKMAN.